US006176964B1

(12) United States Patent
Parente et al.

(10) Patent No.: US 6,176,964 B1
(45) **Date of Patent: *Jan. 23, 2001**

(54) METHOD OF FABRICATING AN ACOUSTIC LINER

(75) Inventors: Charles A. Parente, Oyster Bay; Charles J. Weizenecker, Stony Brook, both of NY (US)

(73) Assignee: Vought Aircraft Industries, Inc., Dallas, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/954,270

(22) Filed: Oct. 20, 1997

(51) Int. Cl.[7] .......... C09J 5/10

(52) U.S. Cl. .......... 156/306.9; 156/307.5; 156/312; 181/292; 442/7; 442/FOR 123; 442/FOR 132

(58) Field of Search .......... 442/7, FOR 123, 442/FOR 132; 156/312, 306.9, 307.5; 181/292

(56) References Cited

U.S. PATENT DOCUMENTS

| | | | | |
|---|---|---|---|---|
| 2,962,403 | | 11/1960 | Jones . | |
| 3,166,149 | * | 1/1965 | Hulse et al. | 181/292 |
| 3,211,253 | | 10/1965 | Gonzalez . | |
| 3,351,154 | * | 11/1967 | Kodaras | 181/292 |
| 3,822,762 | | 7/1974 | Crispin et al. . | |
| 3,950,204 | * | 4/1976 | Williams | 156/330 |
| 3,977,492 | | 8/1976 | Hankel . | |
| 4,294,329 | | 10/1981 | Rose et al. . | |
| 4,300,978 | * | 11/1981 | Whitemore et al. | 181/292 |
| 4,379,191 | * | 4/1983 | Beggs et al. | 181/292 |
| 4,828,932 | | 5/1989 | Morimoto et al. . | |
| 4,990,391 | * | 2/1991 | Veta et al. | 181/292 |
| 5,543,198 | | 8/1996 | Wilson . | |

* cited by examiner

*Primary Examiner*—John J. Gallagher
(74) *Attorney, Agent, or Firm*—Stetina Brunda Garred & Brucker

(57) ABSTRACT

An acoustic liner employable in jet engine housing construction for sound absorption such as for inclusion in nacelle components. The liner has a solid backface sheet having a surface to which is attached a first side of a honeycomb core structure. Attached to the opposing second side of the honeycomb core structure is a mesh structure to which is attached a perforated face sheet to be exposed to the exterior. As is thus apparent, the liner of the present invention provides a mesh situated below a protective perforate sheet. This construction produces an acoustic liner having substantially the efficiency of a linear liner system and the durability of a perforate face sheet system.

6 Claims, 1 Drawing Sheet

METHOD OF FABRICATING AN ACOUSTIC LINER

FIELD OF THE INVENTION

This invention relates in general to noise control, and in particular to an acoustic liner employable in the construction of jet engine housings to absorb sound.

BACKGROUND OF THE INVENTION

In view of the significant amplitude of noise generated by operating jet engines of aircraft, it is common to employ sound absorbing panels or liners such as for nacelle inlet cowls serving the engines to thereby reduce the magnitude of noise volume produced by the engines and released into the environment. Two common acoustic treatments now used on nacelle inlet cowls are either a perforate face sheet system or a linear liner system. The former comprises a perforate face sheet bonded to a honeycomb core structure which is attached to a solid backface sheet. The linear liner system comprises a woven wire mesh structure bonded to a perforate sheet which, in turn, is bonded to a honeycomb core structure. To complete the assembly, the honeycomb core structure is bonded to a solid backface sheet in the same manner as in the perforate face sheet system.

While the linear liner system produces superior sound absorption in comparison to the perforate face sheet system, a problem exists with the woven wire mesh structure of the linear liner system because the mesh structure is exposed to the exterior. Specifically, when mechanics work inside the inlet, or when certain foreign objects strike the liner, the exposed mesh skin is relatively easily susceptible to damage which, of course, must then be repaired to prevent ingestion of mesh structure into the engine. Conversely, the perforate face sheet system does not perform nearly as well acoustically, but its exposed perforate sheet surface withstands usual wear.

In view of the superior performance found in the linear liner structure, it is apparent that a need is present for a liner having sound absorbing qualities equal to such linear liner, except with durability qualities equal to those present in the perforate face sheet system. Accordingly, a primary object of the present invention is to provide an acoustic liner exhibiting such characteristics by incorporating both a mesh structure and a perforate sheet structure.

Another object of the present invention is to provide an acoustic liner wherein a perforate sheet is exposed to the exterior and wherein a mesh structure is disposed immediately below the perforate sheet.

Yet another object of the present invention is to provide an acoustic liner wherein the liner additionally includes a honeycomb core structure immediately beneath the mesh structure and a solid backface sheet immediately beneath the honeycomb core structure.

Still another object of the present invention is to provide an acoustic liner wherein the mesh structure and the backface sheet are bonded to opposing sides of the honeycomb core structure with adhesive chosen and applied to prevent wicking of the adhesive into the woven stainless steel mesh.

These and other objects of the present invention will become apparent throughout the description thereof which now follows.

SUMMARY OF THE INVENTION

The present invention is an acoustic liner employable in jet engine housing construction for sound absorption such as for inclusion in nacelle components. The liner comprises a solid backface sheet having a surface to which is attached a first side of a honeycomb core structure. Attached to the opposing second side of the honeycomb core structure is a mesh structure to which is attached a perforated face sheet to be exposed to the exterior. As is thus apparent, the liner of the present invention provides a mesh situated between the protective perforate sheet and the core structure. This construction produces an acoustic liner having acoustic efficiency substantially equivalent to that of a linear liner system with durability substantially equivalent to that of a perforate face sheet system. As a result, a jet-engine housing built according to the present invention provides both noise control and structural stability.

BRIEF DESCRIPTION OF THE FIGURES

An illustrative and presently preferred embodiment of the invention is shown in the accompanying drawings in which.

DETAILED DESCRIPTION OF THE PREFERRED EMBODIMENT

Figure 1:
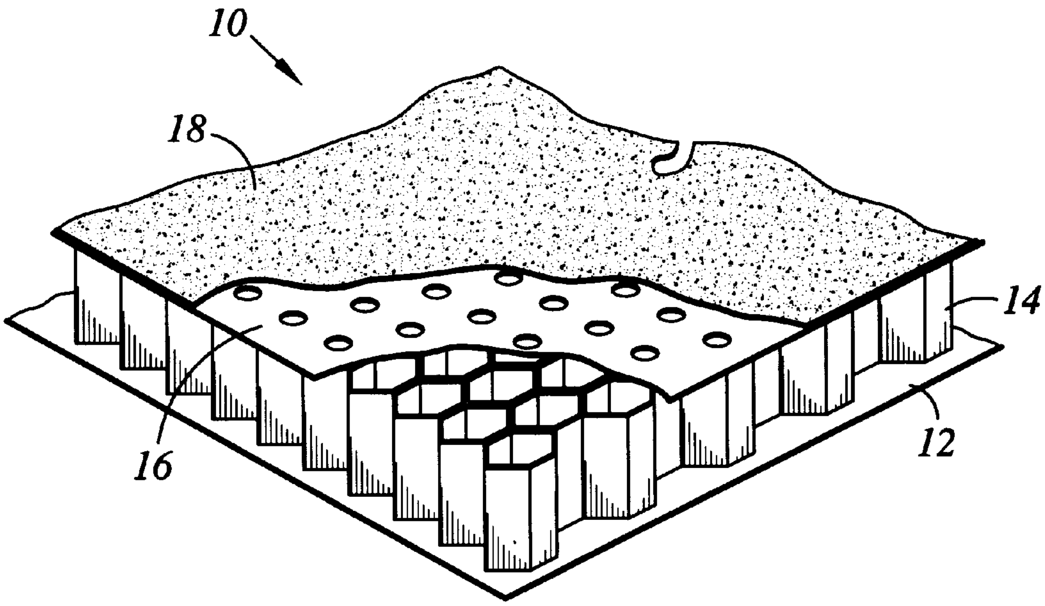
(PRIOR ART) Fig. 1
FIG. 1 is a perspective view partially in section of a portion of a prior art construction of an acoustic liner having a mesh exterior.

Referring to FIG. 1, a portion of a prior art acoustic liner 10 is shown. This liner 10 is commonly referred to as a "linear liner," and is constructed with four components. In particular, the liner 10 has a solid backface sheet 12 to which is bonded a honeycomb core structure 14. To the opposite side of the honeycomb core structure 14 is bonded a perforated sheet 16 which is covered by a mesh structure 18 bonded to the perforated sheet 16. As earlier noted, the linear liner 10 has excellent acoustic performance, but its exposed mesh structure 18 causes durability concerns in view of potential impact damage as well as peel. When such a liner 10 is employed for jet engine nacelles, for example, impact damage can occur from flying objects as well as from mechanics during performance of regular maintenance tasks. If mesh-structure peel occurs, the portion of the structure 18 that becomes free can be ingested into the engine and therefore can create a potential safety hazard.

Figure 2:
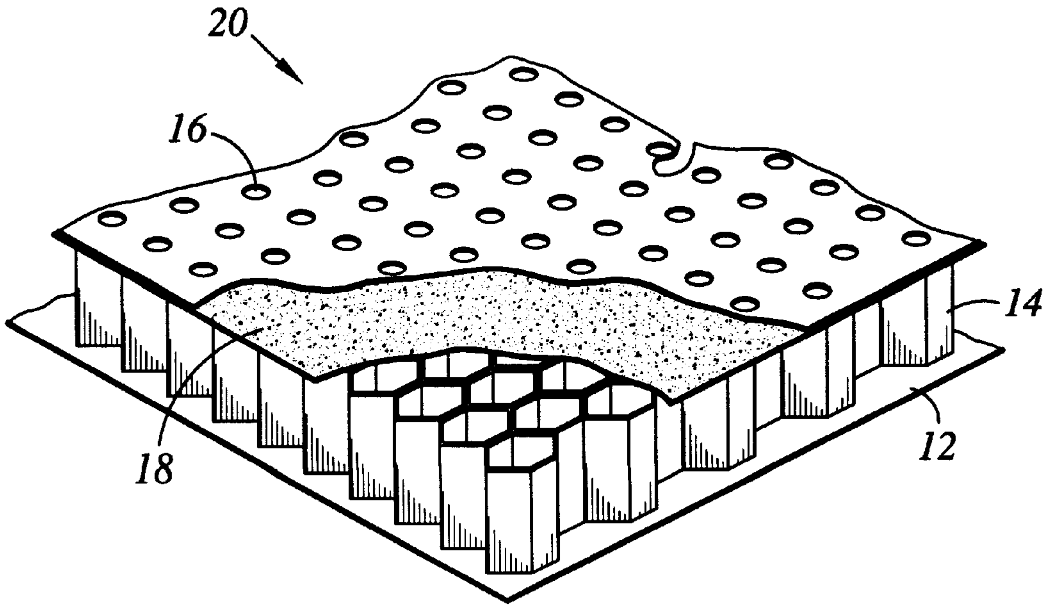
FIG. 2 is a perspective view partially in section of a portion of an acoustic liner providing a perforate face sheet with a mesh structure therebeneath.

Referring to FIG. 2, a portion of an acoustic liner 20 according to the present invention is shown. Specifically, the liner 20 has a solid backface sheet 12 to which is bonded a honeycomb core structure 14. To the opposite side of the honeycomb core structure 14 is bonded a mesh structure 18 which is covered by a perforated sheet 16 bonded to the mesh structure 18. Thickness of the sheet 16 is preferably between about 0.025 inch and 0.032 inch. Perforate hole diameter preferably is between about 0.056 inch and 0.058 inch, having 60 degree staggered hole spaces between about 0.089 inch and 0.097 inch. Porosity of the sheet 16 preferably should provide between about 30% and 38% open area. Bonding of the mesh structure 18 to the honeycomb core structure 14 is preferably accomplished through application of a low-flow reticulating adhesive such as the supported film adhesive produced by Dexter Hysol under the catalog number EA9689, 0.06 PSF. The opposite side of the core structure 14 is bonded to a backface sheet 12 with an adhesive produced by Dexter-Hysol under catalog number EA9689 0.10 psf unsupported.

Employment of a reticulating adhesive minimizes wicking of the adhesive into the mesh structure 18 as well as into the core structure 14 to thereby maintain acoustic properties. Bonding of the perforated sheet 16 to the mesh structure 18 likewise is accomplished by spraying an adhesive such as the sprayable epoxy adhesive produced by 3M Company under the catalog number EC3710-20% solids on the surface of the perforated sheet 16 to be in contact with the mesh structure 18.

While non-metallic materials can be employed in constructing the acoustic liner 20 depending upon its application, in the embodiment illustrated in FIG. 2 the backface sheet 12, core structure 14 and perforated sheet 16 are fabricated of aluminum, while the mesh structure 18 is constructed of woven stainless steel wire. The mesh structure 18 is preferably about 0.006 inch thick, with a resistance that varies depending upon acoustic requirements. The perforated sheet 16 is about 0.025 inch thick with hole diameter about 0.057 inch, while the core can be from 0.5 inch to two inches thick with a cell size from about one-fourth inch to three eighth inch. The backface sheet 12 is preferably 2024-T81 aluminum having a thickness of about 0.063 inch. Fabrication preparation commences with degreasing the aluminum core structure 14 and stainless steel mesh structure 18. The core structure 14 then is primed on opposing sides with an epoxy sprayable adhesive primer such as that produced by Dexter Hysol under the catalog number EA9205-20% solids, and cured at 325° F. The reticulating adhesive is B-staged at 175° F., and reticulated on the core structure 14 for bonding of the mesh structure 18. The opposite side of the core structure 14 is bonded to the backface sheet 12 with an adhesive produced by Dexter Hysol under Catalog Number EA9689 0.10 psf supported epoxy film adhesive. Bonding is accomplished in an autoclave at 350° F. and 45 psi pressure. The term "B-stage" is an intermediate stage in the reaction of the epoxy film adhesive in which the adhesive has been heated to a temperature below the final cure temperature for a period of time to minimize adhesive flow during the final cure cycle and prevent the adhesive from reducing the mesh percent open area. For the adhesive here used, the temperature is 170–175° F. for two to four hours.

The aluminum perforated sheet 16 is heat treated to the T4 condition, straightened, and aged to the T62 condition. The "T" condition is the temper of an aluminum alloy that defines its strength and corrosion characteristics. "T4" represents that the alloy was solution heat treated (heated to a certain temperature and then immediately cooled in a water or glycol bath) and naturally aged at room temperature to attain its final properties. "T62" represents that the aluminum alloy is treated the same as in the "T4" procedure except that it is aged in an oven (artificially aged) to attain its final properties. Thereafter, the perforated sheet 16 is sulfuric-acid anodized, primed with epoxy primer, such as that produced by Dexter Hysol under the catalog number EA9205-20% solids as identified above, and the primer cured at 345° F. Adherence of the perforated sheet 16 to the mesh structure 18 is accomplished by spraying an epoxy adhesive, such as that produced by 3M under the catalog number EC3710-20% solids, on the exit punch side of the perforated sheet 16, B-staging the sheet adhesive on 16 at 210° F., and completing layup and bonding thereof in an oven/vacuum bag at 300° F.

As will be appreciated by those with ordinary skill in the art, the principles of this invention can be practiced for many applications. Thus, while an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for fabricating an acoustic liner for sound absorption, the method comprising:

a) priming opposing sides of a honeycomb core structure by applying an epoxy adhesive primer to each side and curing said primer;

b) applying a B-stage cured adhesive on exposed end surfaces of the core structure, placing a mesh structure on that side of the core structure against said adhesive and applying a supported film adhesive to the opposite side of the core structure to which a backface sheet is applied and heating the resultant product for a time sufficient to cause adhesive-cured bonding of the backface sheet and the mesh structure to the core structure;

c) priming a perforated sheet by applying an epoxy primer on one side thereof, curing said primer, and applying an epoxy adhesive on said side and thereafter B-stage curing said epoxy adhesive; and d) placing said one side of the perforated sheet on the mesh structure and heating the resultant product for a time sufficient to cause adhesive-cured bonding of the perforated sheet to the mesh structure.

2. A method for fabricating an acoustic liner as claimed in claim 1 wherein the mesh structure is stainless steel.

3. A method for fabricating an acoustic liner as claimed in claim 2 wherein the backface sheet, core structure and perforated sheet are constructed of aluminum.

4. A method for fabricating an acoustic liner as claimed in claim 3 wherein the mesh structure is about 0.006 inch thick, the perforated sheet is about 0.025 inch thick, the core structure is between about 0.5 inch and 2 inches thick, and the backface sheet is about 0.063 inch.

5. A method for fabricating an acoustic liner as claimed in claim 4 wherein in the perforated sheet hole diameters thereof are between about 0.056 inch and 0.058 inch.

6. A method for fabricating an acoustic liner as claimed in claim 5 wherein porosity of the perforated sheet provides between about 30% and 38% open area.

* * * * *